United States Patent [19]
Pan et al.

[11] Patent Number: 6,018,534
[45] Date of Patent: Jan. 25, 2000

[54] FIBER BRAGG GRATING DFB-DBR INTERACTIVE LASER AND RELATED FIBER LASER SOURCES

[75] Inventors: Jing-Jong Pan, Milpitas; Yuan Shi, San Jose, both of Calif.

[73] Assignee: E-Tek Dynamics, Inc., San Jose, Calif.

[21] Appl. No.: 09/114,712

[22] Filed: Jul. 13, 1998

[51] Int. Cl.[7] .................................................. H01S 3/30
[52] U.S. Cl. ................... 372/6; 372/102; 372/96; 372/69; 385/24; 385/39; 385/37
[58] Field of Search .................. 372/6, 69, 102, 372/96; 385/24, 39, 37

[56] References Cited

U.S. PATENT DOCUMENTS

| | | | |
|---|---|---|---|
| 5,594,747 | 1/1997 | Ball | 372/102 |
| 5,892,781 | 4/1999 | Pan et al. | 372/6 |

OTHER PUBLICATIONS

Agrawal, *Nonlinear Fiber Optics, Second Edition*, Academic Press, 1995, Chapter 12, pp. 539–540, no month.

*Primary Examiner*—Leon Scott, Jr.
*Attorney, Agent, or Firm*—Townsend and Townsend and Crew LLP

[57] ABSTRACT

A fiber Bragg grating DFB-DBR interactive laser is provided by an optical fiber section which is doped with at least one gain-inducing material. At each end of the section there is a fiber Bragg grating which operates as part of a fiber DBR laser. Between these two gratings there is a third fiber Bragg grating which has a 90° phase shift region. The third fiber Bragg grating effectively operates as part of a fiber DFB laser. Each of the fiber Bragg gratings has a narrow reflective linewidth centered about the same wavelength so that the optical fiber section operates as a fiber Bragg grating DFB-DBR interactive laser upon sufficient pumping energy. The resulting fiber Bragg grating DFB-DBR interactive laser can be appropriately connected to pumping laser sources and WDM couplers to create fiber laser sources which are particularly adaptable to fiberoptic networks, particularly WDM and DWDM networks.

27 Claims, 6 Drawing Sheets

FIBER BRAGG GRATING DFB-DBR INTERACTIVE LASER AND RELATED FIBER LASER SOURCES

BACKGROUND OF THE INVENTION

The present invention is related to the field of laser sources and, more particularly, to fiber lasers using fiber Bragg gratings.

Fiberoptic systems, such as those in the fields of telecommunications, data communications, sensors, instrumentation and the like, require laser sources which are very stable, have high power, i.e., greater than 10 mW, and low noise. This is true for WDM (Wavelength Division Multiplexed) networks, in particular, which demand a large number of narrow linewidth laser sources for signal generation. Since the wavelength of an optical signal is used to direct the signal from its source to its destination, each user typically has a laser source operating at a specific wavelength different from other laser sources. A stable laser source having a fixed wavelength is highly desirable. Furthermore, an emerging standard is the Dense WDM (DWDM) proposed by the ITU, the International Telecommunications Union, in which the separation between communication channels is only 0.8 nm, or 100 GHz in frequency. Thus a light source for such a network must also have a very narrow output linewidth, i.e., the wavelength of the output signal must be concentrated in a very narrow portion of the optical spectrum.

Heretofore, light sources for fiberoptic networks have been mostly semiconductor devices, such as laser diodes, light-emitting diodes, and other semiconductor laser sources. In particular, the semiconductor laser diode has been the standard laser source for its size, cost, and compatibility with optical fibers in fiberoptic networks. However, the conventional semiconductor laser diode has many inherent shortcomings, including low power, spectral instability over changes in temperature, and low fabrication yields which keep costs high. A new type of laser source is a rare-earth doped optical fiber section with wavelength-selective reflectors at the ends of the section to define a lasing cavity. As in the case of the erbium-doped fiber amplifier, a pumping laser supplies energy to the doped fiber section at one, or multiple, wavelengths. The doped fiber section lases at one, or multiple, different output wavelengths. While seemingly compatible with fiberoptic networks, this laser source has a relatively low output power and the advantages of this laser source have yet to be appreciated.

The present invention provides for a novel fiber laser with a very narrow linewidth output with output power greater than that of other fiber lasers. The output of the fiber laser according to the present invention has low noise, minimal relaxation oscillation, good stability over changes in temperature, and very narrow output linewidths. The fiber laser can be arranged into laser sources which are readily adaptable to fiberoptic networks, particularly WDM and DWDM networks.

SUMMARY OF THE INVENTION

The present invention provides for a fiber laser formed from an optical fiber section which is doped with at least one gain-inducing material, such as a rare-earth metal. A first fiber Bragg grating is formed at one end of the optical fiber section and a second fiber Bragg grating is formed at the other end of the optical fiber section. A third fiber Bragg grating is formed in the optical fiber section between the first and second fiber Bragg gratings with a 90° (Π/2) phase shift region therein. The first, second and third fiber Bragg gratings each has its narrow reflective linewidths centered about the same wavelength to form a fiber Bragg grating DFB-DBR interactive laser. Preferably, the fiber Bragg gratings are formed in a single, unitary optical fiber section.

Furthermore, the present invention provides for fiber laser sources with high output power so as to be particularly adaptable to fiberoptic networks. By suitably interconnecting a single pumping laser source, a fiber Bragg grating DFB-DBR interactive laser and a rare-earth doped section of optical fiber, i.e., a fiber amplifier, the pumping laser source provides pumping energy for both the fiber Bragg grating DFB-DBR interactive laser and the fiber amplifier. The resulting fiber laser source has high output power with low noise and narrow linewidths.

DETAILED DESCRIPTION OF SPECIFIC EMBODIMENTS

Figure 1:
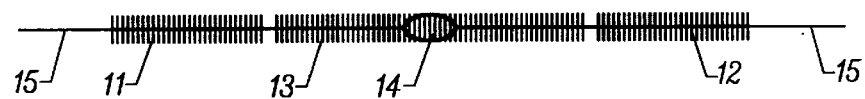
FIG. 1 is a representative diagram of a fiber Bragg grating DFB-DBR interactive laser, according to the present invention.

FIG. 1 illustrates the basic structure of the fiber Bragg grating DBF-DBR interactive laser, according to the present invention. The laser has an optical fiber section 15 which is doped with a gain-inducing rare-earth element or combinations of rare-earth elements (and other elements). For example, a doping of erbium, or erbium and ytterbium, or lanthanum, sulfur and gallium works effectively. Alternatively, other lasing ions in different host materials may be used. The doped section 15 is created from a single mode optical fiber. In the optical fiber section 15 there are two fiber Bragg gratings 11 and 12 which form two end reflectors to define the equivalent of a resonating cavity between themselves so as to form a DBR (Distributed Bragg Reflector) fiber laser. Both fiber Bragg gratings 11 and 12 have a selective reflectivity at the same wavelength. The fiber Bragg grating 11 has a high reflectivity and the other fiber Bragg grating 12 has a reflectivity determined for optimum output coupling to control the output of the resulting fiber laser for different applications.

Between the two gratings 11 and 12 is a third fiber Bragg grating 13 having a 90° (Π/2) phase-shift region 14. Though the phase shift region 14 is shown as being centrally located, it can also be located away from the central point. The grating 13 has a selective reflectivity at the same wavelength as the other two gratings 11 and 12, and operates a fiber DFB (distributed feedback) laser.

When energized by a pumping laser source, the DBR fiber laser, i.e., the gratings 11 and 12, interacts with the fiber DFB laser, the grating 13 and phase-shift region 14, to form a fiber laser with characteristics superior to either the DBR fiber laser or the DFB fiber laser. It is believed that the fiber interactive DBR-DFB laser operates in the following manner: The DBR fiber laser can generate an output of several different wavelength modes compatible with the "resonant cavity" formed by the fiber Bragg gratings 11 and 12. From the wavelengths defined by the FSR (Free Spectral Range) of the DBR laser, the DFB fiber laser, the fiber Bragg grating 13 and its Π/2 phase shift region 14, selects one of the wavelengths. Rather than several wavelength modes, the DBR laser has one lasing wavelength mode. The result is that energy is directed into the selected wavelength.

Figure 2A:
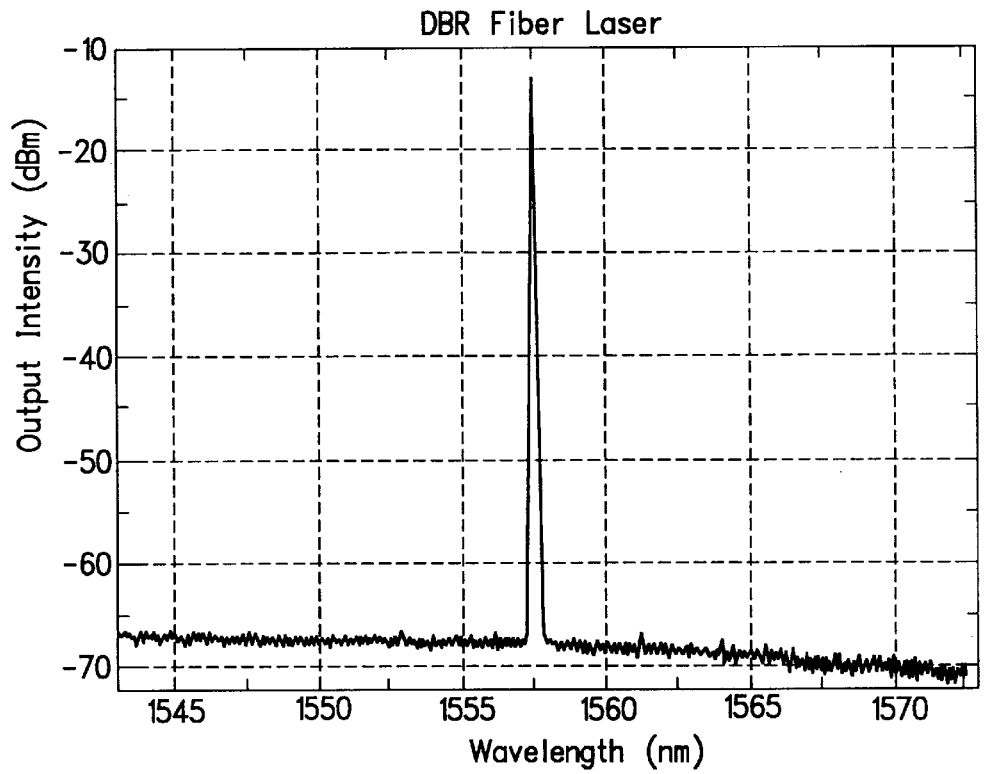
FIG. 2A is a plot of output intensity versus wavelength for a DBR fiber laser.
Figure 2B:
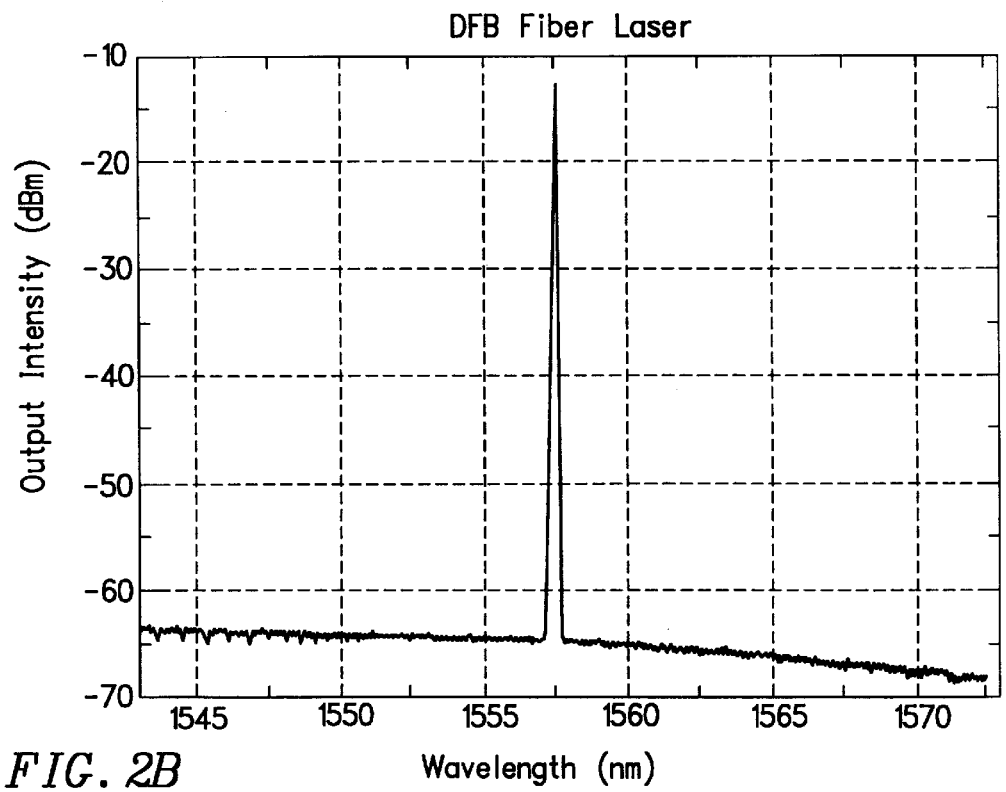
FIG. 2B is a plot of output intensity versus wavelength for a DFB fiber laser.
Figure 2C:
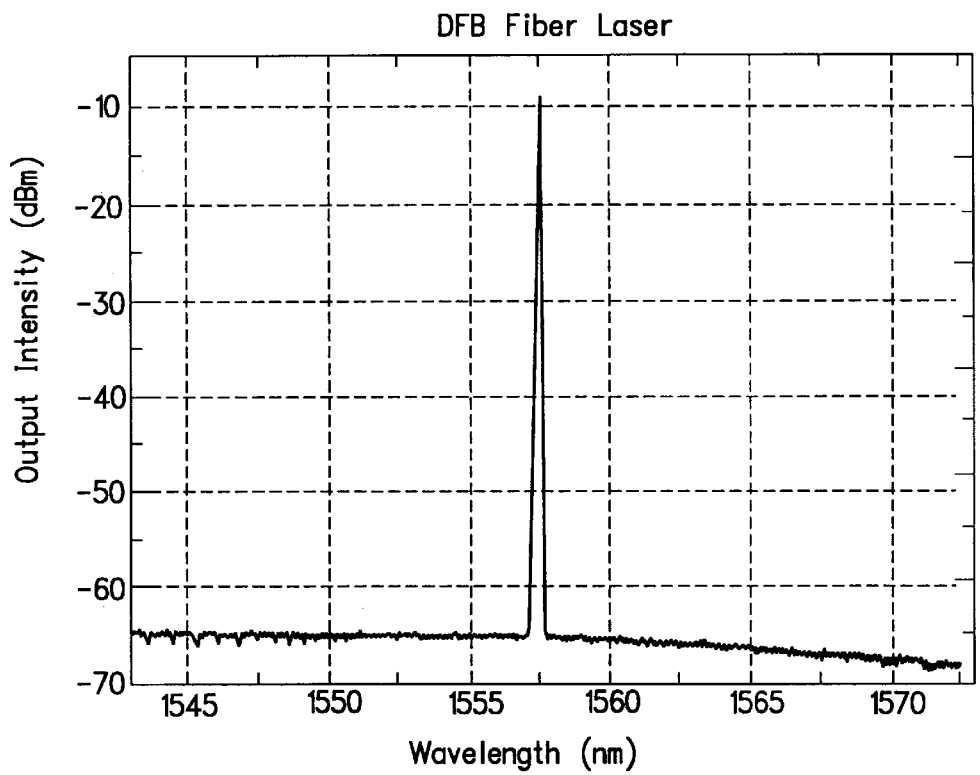
FIG. 2C is a plot of output intensity versus wavelength for an interactive DBR-DFB fiber laser.

Measured results of the fiber Bragg grating DFB-DBR interactive laser are quite remarkable. FIGS. 2A–2C plot the output spectrum of a DBR fiber laser, a DFB fiber laser, and a fiber Bragg grating DFB-DBR interactive laser respectively. All fiber lasers receive the same pumping power and all outputs are in the 1550 nm range, which refers to the range of wavelengths commonly used for signal transmission in fiberoptic networks today and, in particular, the range of wavelengths used in WDM and the more stringent DWDM networks. In comparison, wavelengths of the pumping laser sources, as described further below, are at shorter wavelengths, e.g., 980 and 1480 nm, and vary as typical laser diode source outputs.

FIG. 2A illustrates the typical output of a DBR fiber laser. The output power is −12.88 dBm with a peak-to-background extinction ratio of 55 dB. FIG. 2B illustrates the output of a DFB fiber laser alone; FIG. 2C illustrates the output of the same DFB fiber laser with an interacting fiber DBR laser. As shown by FIG. 2B, the DFB laser has an output power of −12.98 dBm, less than that of the DBR laser, and a peak-to-background extinction ratio of 53 dB, again less than that of the DBR laser. On the other hand, the interactive DFB-DBR fiber laser of FIG. 2C has an output power of −9.89 dBm, a doubling of the output power over that of the DBR and DFB fiber lasers, and a peak-to-background extinction ratio of 56 dB.

Figure 3A:
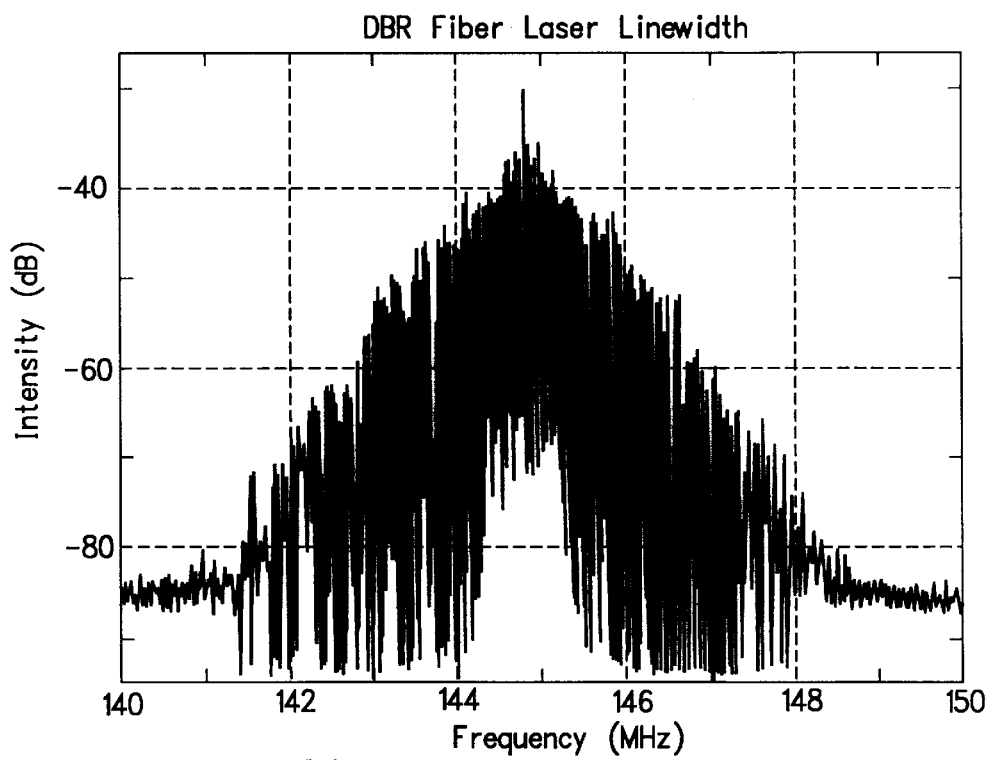
FIG. 3A is a plot of output intensity versus frequency for a DBR fiber laser.
Figure 3B:
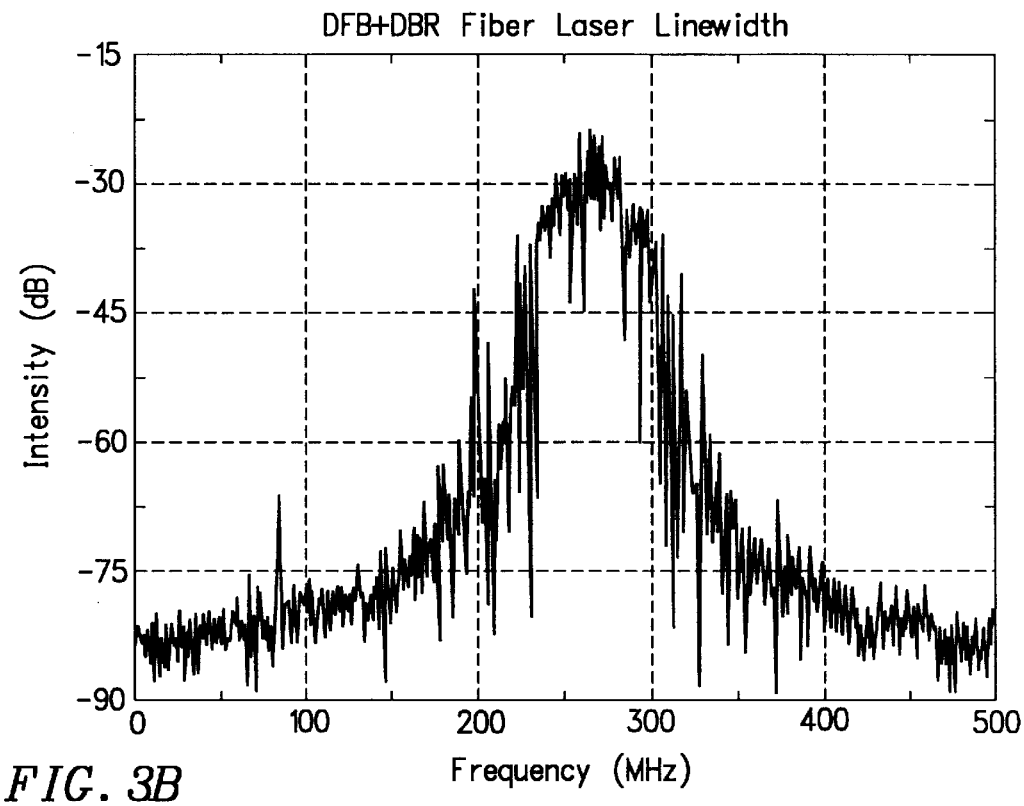
FIG. 3B is a plot of output intensity versus frequency for an interactive DBR-DFB fiber laser.

The linewidths of the DBR fiber laser and the interactive DFB-DBR fiber laser are illustrated in FIGS. 3A and 3B. FIG. 3A shows that the DBR fiber laser has a fairly broad linewidth of 1–2 MHz. It has been found that the output linewidths of both the DFB and the interactive DFB-DBR fiber lasers are about the same and the linewidth of the interactive DFB-DBR fiber laser is illustrated in FIG. 3B. Note that the linewidth is less than 100 KHz, much narrower than that of the DBR fiber laser.

Figure 4A:
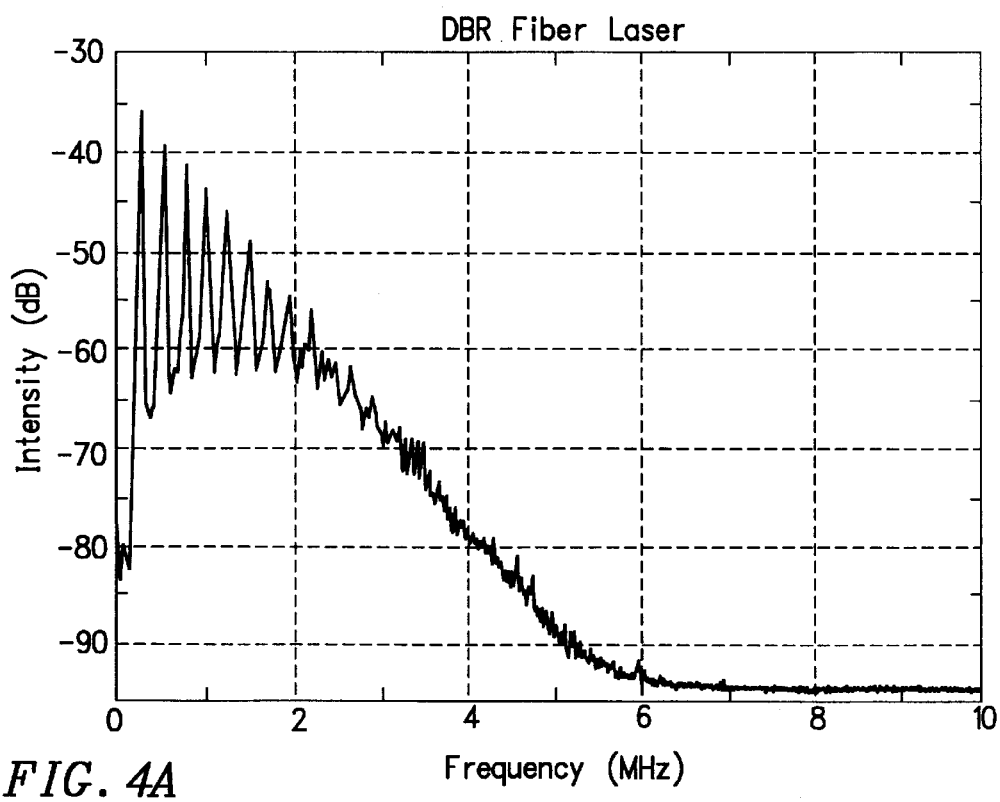
FIG. 4A is a plot of output intensity versus frequency for a DBR fiber laser.
Figure 4B:
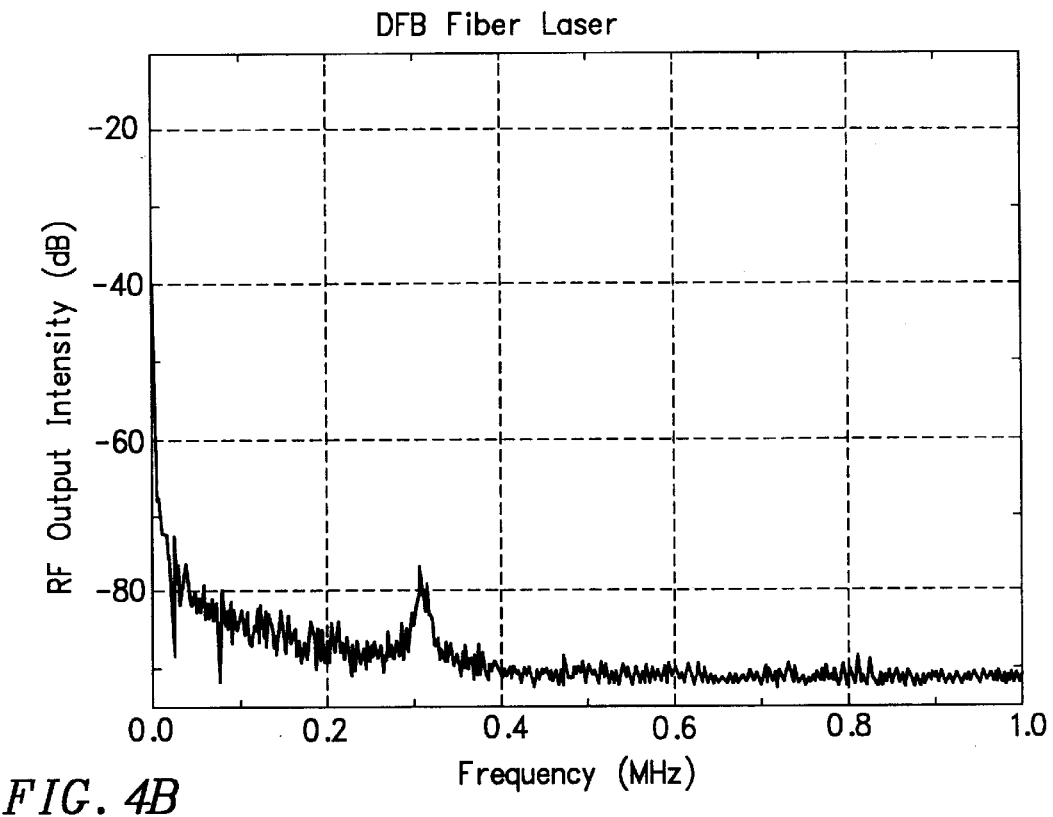
FIG. 4B is a plot of output intensity versus frequency for a DFB fiber laser.
Figure 4C:
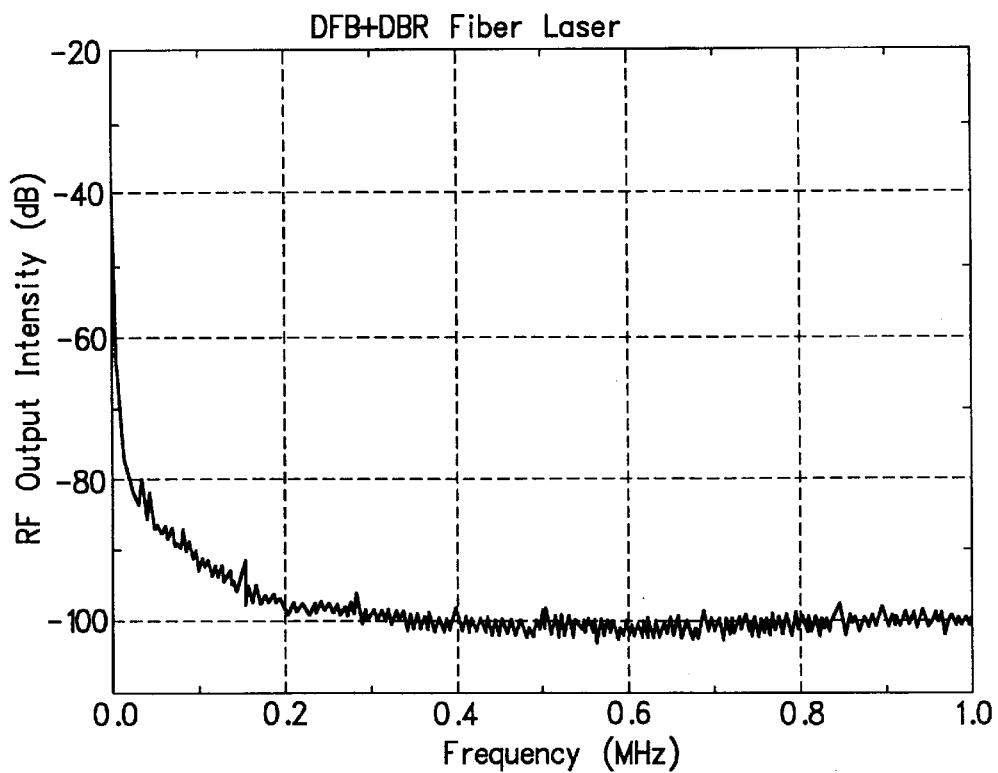
FIG. 4C is a plot of output intensity versus frequency for an interactive DBR-DFB fiber laser.

FIGS. 4A–4C illustrate the stability of the output of the three different fiber lasers. FIG. 4A plots the output intensity of a DBR fiber laser as measured by a spectrum analyzer. There is substantial pulsing of the output at RF frequencies; this is understood to be caused by relaxation oscillation and ion-pair pulsing. The DFB fiber laser, as shown in FIG. 4B, has a much quieter output. The pulsing effects which cause noise at RF frequencies are effectively suppressed. The output of the interactive DFB-DBR fiber laser shown in FIG. 4C is also much smaller to that of the DBR fiber laser.

The interactive DFB-DBR fiber laser can be constructed by creating the DFB Bragg grating 13 (with the phase shift region 14) in a short fiber section doped with the rare-earth gain material (or other gain materials) and fuse splicing optical fiber sections with each of the fiber Bragg gratings 11 and 12 at either end to form the DBR laser. There are problems with this method, however. It is difficult to fabricate three separate fiber Bragg gratings with exactly the same wavelength. Secondly, the proper splicing by fusing the ends of optical fibers is a difficult operation. Finally, the fused splicing cause additional insertion loss which degrades the performance of the fiber laser.

A more effective manufacturing technique is to manufacture all three fiber Bragg gratings 11–13 in a single, unitary optical fiber section. This is done by using a phase mask for all three fiber Bragg gratings and scanning the optical fiber section, i.e., the section 15, with the phase mask to create all three fiber Bragg gratings 11–13.

Figure 5:
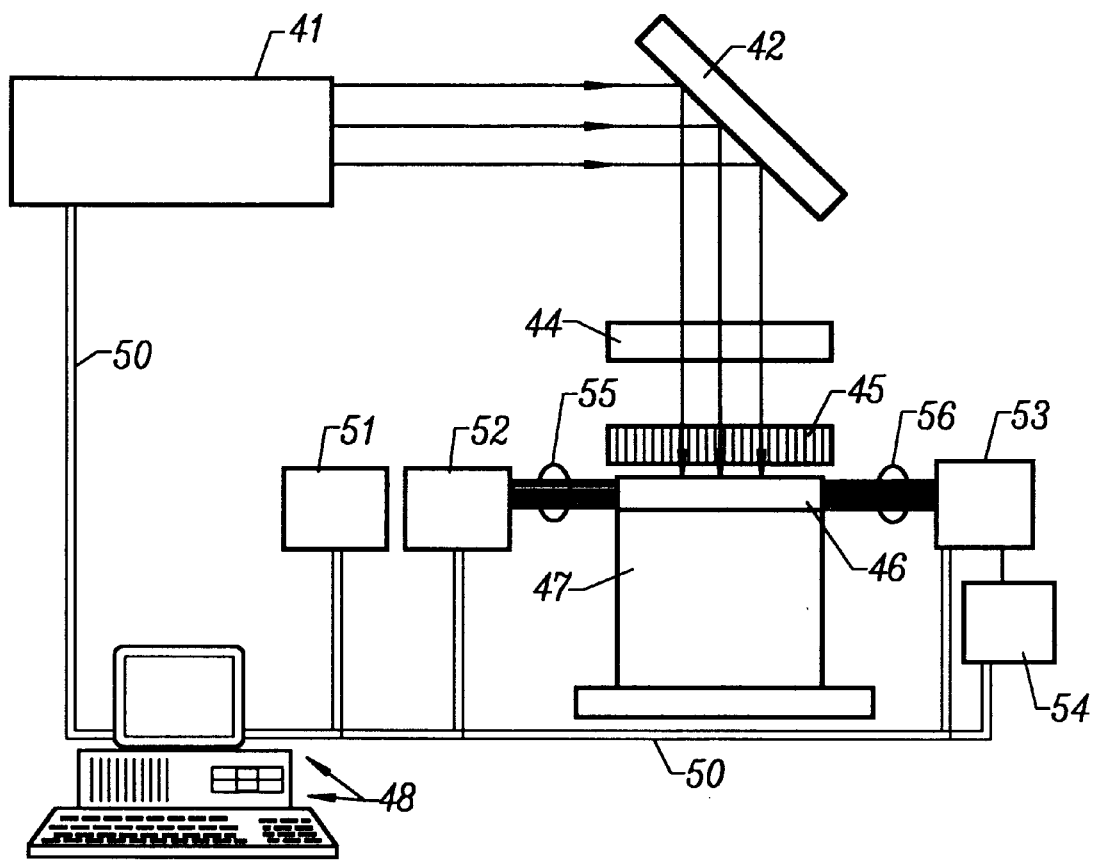
FIG. 5 illustrates the equipment for creating a fiber Bragg grating DFB-DBR interactive laser in a single optical fiber section.

FIG. 5 illustrates the general arrangement of the equipment which might be used for such manufacturing. An excimer laser 41 directs its UV output against a UV reflector 42. The reflector 42 then directs the UW light through a cylindrical lens 44 to the phase mask 45 and a fiber plate 46. The cylindrical lens 44 collimates the light before reaching the phase mask 45 which creates the interference patterns of the UV light to create a fiber Bragg grating in an optical fiber. The phase-shift region 14 is created by suitably irradiating a central portion along the length of the DFB fiber Bragg grating 13 with UV light. The fiber plate 46, which is mounted to a fiber plate controller 47, holds a single fiber or a plurality of optical fibers in which fiber Bragg gratings are to be created near the phase mask 45. The UV light from the phase mask 45 writes a fiber Bragg grating in one optical fiber at a time.

Control over the manufacturing operations is performed by a computer 48 over a bus 50 which, in this case, operates under the IEEE488 standard. The bus 50 connects the computer 48 to the excimer laser 41, a laser or white light source 51, a 1×8 optical switch 52, a second 1×8 optical switch 53 and an optical spectrum analyzer 54. The computer 48 further controls the fiber plate controller 47 which handles the physical positioning of the fiber plate 46. In the present example, eight optical fibers are held in the plate 46. As shown by the optical fiber bundles 55 and 56, the ends of the optical fibers mounted to the plate 46 are connected respectively to optical switches 52 and 53. By control of the laser 51 and the optical switch 52, the computer 48 can send selected optical signals in the 1550 nm range to a selected optical fiber held in the plate 46. The UV light, through the interference pattern generated by the phase mask 45, writes a fiber Bragg grating on the selected optical fiber. The second optical switch 53 sends the light from the laser source 51 which passes through the selected optical fiber to the optical spectrum analyzer 54 to monitor the creation of the fiber Bragg grating in the selected optical fiber in situ.

In accordance with the present invention, the phase mask 45 is large enough to hold the entire fiber section for the three fiber Bragg gratings 11–13. The light from the reflector 42 and the cylindrical lens 44 is directed upon a portion of the phase mask 45. The fiber Bragg gratings 11–13 can be scanned by the fiber plate 46 moving along the longitudinal axis of the selected optical fiber. Alternatively, if the reflector 42 is suitably mounted and controlled, the reflector 42 can be rotated so that the interference patterns from the phase mask 45 are scanned onto the fixed optical fiber. Finally, both the reflector 42 and the plate 46 can be moved in a coordinated fashion.

It has been found advantageous to construct the fiber Bragg grating 13 with the phase-shift region 14 in the rare-earth, or other gain-inducing ion, doped optical fiber section 15 first. Then the high reflectivity fiber Bragg grating 11 is constructed, followed by the construction of the output coupling fiber Bragg grating 12. The reflectivity of the fiber Bragg grating 12 is monitored during construction to maximize the output power of the fiber interactive DFB-DBR laser.

Further details of techniques to manufacture a plurality of fiber Bragg gratings in an optical fiber are described in U.S. appln. No. 09/120,870, filed of even date by J. J. Pan, Feng Qing Zhou and Yuan Shi, and entitled, "METHOD AND APPARATUS OF MANUFACTURING APODIZED PHASE MASKS AND RELATED DEVICES" (atty's ref. no. 013011–007300), which is hereby incorporated by reference.

Besides avoiding the disadvantages of splicing the fiber Bragg gratings 11–13 together as mentioned above, the construction of the fiber Bragg gratings in a single optical fiber section has another, perhaps more subtle, advantage. With the manufacturing techniques described above, the DBR fiber Bragg gratings 11 and 12 can be placed closer together on either side of the DFB fiber Bragg grating 13. This spreads the output modes of the DBR laser further apart, i.e., increases the FSR, so that selection of the single mode by the DFB laser is enhanced. The likelihood of mode skipping and broadening of the output linewidth of the fiber Bragg grating interactive DFB-DBR laser is reduced. For example, in the specific fiber Bragg grating interactive DFB-DBR lasers described below, the optical fiber section 15 containing the fiber Bragg gratings 11–13 is 60 mm or greater. By shortening this length and, hence, the distance between the DBR fiber Bragg gratings 11 and 12, the outstanding performances of the fiber laser 10 and the corresponding fiber laser sources are expected to be even better.

Figure 6:
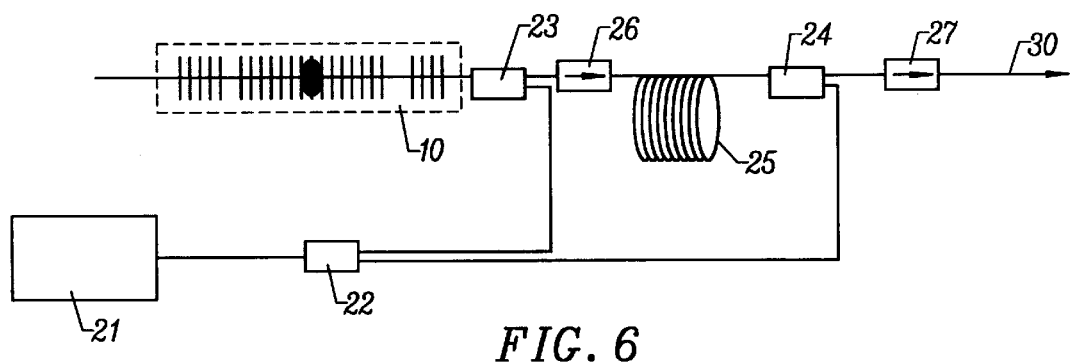
FIG. 6 is a representative diagram of a fiber laser source arrangement of a fiber Bragg grating DBF-DBR interactive laser, according to the present invention.
Figure 7:
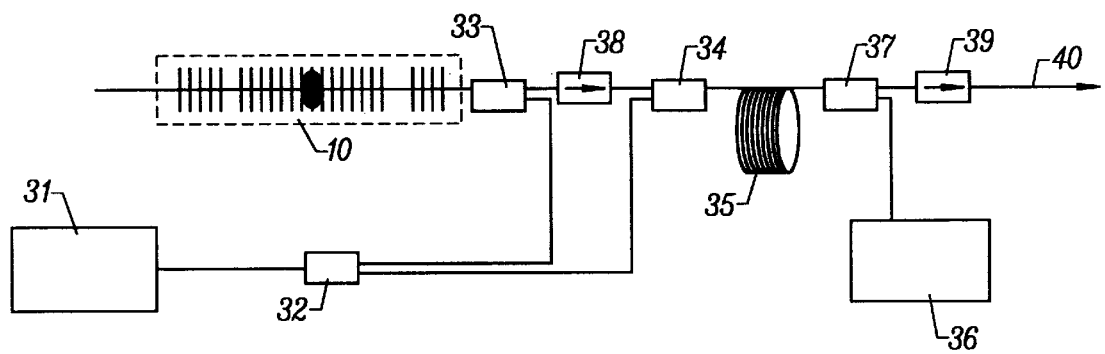
FIG. 7 is a representative diagram of another fiber laser source arrangement of a fiber Bragg grating DBF-DBR interactive laser, according to another embodiment of the present invention.

FIGS. 6 and 7 show various arrangements of the interactive DFB-DBR laser as a laser source. As illustrated in FIG. 6, the output end of an interactive DFB-DBR fiber laser 10 is connected to a pumping laser source 21, i.e., a laser diode, by a WDM coupler 23 through a coupler 22 which splits the output of the laser source 21. Only part of the optical pumping energy from the laser source 21 is directed toward the WDM coupler 23 and the interactive DFB-DBR laser 10. The WDM coupler 23 also connects the interactive DFB-DBR laser 10 to one end of a rare-earth doped section 25 of optical fiber though an optical isolator 26. The section 25 is typically doped with erbium to form an erbium-doped fiber amplifier. Other rare earth elements, such as ytterbium and praseodymium, or other doped lasing ions may be used. The other end of the section 25 is connected to a second WDM coupler 24 which is connected to an output fiber 30 by an optical isolator 27. The optical isolator 27 isolates the rest of the described laser source arrangement from errant signals from the output fiber 30.

The WDM coupler 24 is also connected to the second output from the pumping laser source 21 split by the coupler 22. Part of the output from the pumping laser source 21, which has an output wavelength of typically 980 or 1480 nm, and is split by the coupler 22, is sent by the WDM coupler 23 to energize the fiber interactive DFB-DBR laser 10, which lases in the 1550 nm range. The resulting output from the laser 10 is passed by the WDM coupler 23 into the rare-earth doped optical fiber section 25. The optical isolator 26 prevents any backward propagating light from interfering with the operation of the fiber interactive DFB-DBR laser 10. The section 25 is also energized by the second split output from the pumping laser source 21 through the WDM coupler 24 and amplifies the optical signal from the laser 10.

The described WDM couplers discriminate between light at the pumping laser source wavelengths, e.g., 980 nm and 1480 nm, and light in the 1550 nm range. Details of the WDM couplers which may be used for the WDM couplers 23 and 24 are described in U.S. Pat. No. 5,642,448. This arrangement is advantageous because the single pumping laser source 21, which can saturate the output power of the fiber laser 10 to lower the efficiency of the pumping laser, energizes both the fiber interactive DFB-DBR laser 10 and the fiber amplifier formed by the rare-earth doped section 25.

In a specific example of the fiber laser source of FIG. 6, the interactive DFB-DBR fiber laser 10 has its optical fiber section 15 co-doped with erbium and ytterbium. The DFB fiber Bragg grating 13 has a reflectivity of 18 dB and the high reflectivity fiber Bragg grating 11 has a reflectivity of 24 dB and a length of 18 mm. The total length of the optical fiber section 15 is 60 mm. The laser source 21 has an output of 160 mW at a wavelength of 980 nm with 20% of its output directed toward the fiber laser 10 and 80% directed toward the erbium-doped fiber amplifier section 25. The resulting laser source has an output of 62 mW with low RIN (Relative Intensity Noise) which is better than −160 db/Hz over 30 MHz. Efficiency is at 38%. The output spectrum has a side mode suppression of $\geq 50$ dB with a linewidth of only 200 kHz.

Another arrangement of a laser source using a fiber Bragg grating interactive DFB-DBR laser with even greater output power is shown in FIG. 7. As in the FIG. 6 arrangement, the output of a pumping laser 31 is split by a coupler 32. One split output is connected to the output end of the interactive DFB-DBR fiber laser 10 by a WDM coupler 33 so that only part of the optical pumping energy from the laser source 31 is directed toward the interactive DFB-DBR laser 10. The WDM coupler 33 also connects the interactive DFB-DBR laser 10 to one end of a rare-earth doped section 35 of optical fiber, which forms a fiber amplifier, by an optical isolator 38 and a second WDM coupler 34. The other end of the section 35 is connected to a third WDM coupler 37 which is connected to an output fiber 40 by an optical isolator 39. The WDM coupler 37 is also connected to the output from a second pumping laser source 36. The second output split by the coupler 32 is connected to the second WDM coupler 34. Hence the interactive DFB-DBR laser 10 is connected to two pumping laser sources 31 and 36.

The first pumping laser source 31 supplies the pumping energy to the interactive DFB-DBR fiber laser through the WDM coupler 33 and to the erbium-doped fiber amplifier section 35 through the WDM coupler 34. The second pumping laser source 36 also supplies its energy to the doped fiber section 35. With the laser source 31 having an output of 160 mW at a wavelength at 980 nm (and split 30% of its output to the fiber laser 10 and 70% to the erbium-doped fiber amplifier section 35) and the laser source 36 having a 158 mW output at 1480 nm, this fiber laser source has an output of 166 mW and an output linewidth of only 200 KHz. Side-mode suppression is over 52 dB and RIN less than −160 dB/Hz over 30 MHz.

Note that the FIG. 7 fiber laser source arrangement can be modified so that the coupler 32 is connected to the WDM coupler 37 and the second pumping laser source 36 is connected to the WDM coupler 34. The modified arrangement permits the pumping laser source 31 to energize the interactive DFB-DBR fiber laser and the erbium-doped fiber amplifier section 35 in the same manner as the pumping laser source 21 in FIG. 6.

While the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

What is claimed is:

1. A fiber laser comprising:
    an optical fiber section doped with at least one gain-inducing material, said fiber section having first and second ends;
    a first fiber Bragg grating in said optical fiber section at said first end;
    a second fiber Bragg grating in said optical fiber section at said second end; and
    a third fiber Bragg grating in said optical fiber section between said first and second fiber Bragg gratings, said third fiber Bragg grating having a 90° phase shift region therein, said first, second and third fiber Bragg gratings each having narrow reflective linewidths centered about the same wavelength;
    whereby said laser source forms a fiber Bragg grating DFB-DBR interactive laser upon sufficient pumping energy.

2. The fiber laser of claim 1 wherein said optical fiber section has a length less than 60 mm.

3. The fiber laser of claim 1 wherein said optical fiber section comprises a single mode optical fiber.

4. The fiber laser of claim 1 wherein said gain inducing material comprises a rare-earth metal.

5. The fiber laser of claim 4 wherein said one rare-earth metal comprises erbium.

6. The fiber laser of claim 5 wherein said optical fiber section is co-doped with ytterbium.

7. The fiber laser of claim 1 wherein said optical fiber section is doped with gallium, sulfur and lanthanum.

8. The fiber laser of claim 1 further comprising first and second fused splicings in said optical fiber section, said first fused splicing between said first fiber Bragg grating and said third fiber Bragg grating, and said second fused splicing between said second fiber Bragg grating and said third fiber Bragg grating.

9. The fiber laser of claim 1 wherein said optical fiber section is unitary.

10. The fiber laser of claim 1 wherein said first fiber Bragg grating has a reflectivity greater than that of said second fiber Bragg grating.

11. A laser source generating optical energy at a first wavelength for an output optical fiber, said laser source comprising:
    a first pumping laser generating optical energy at a second wavelength;
    a first coupler connected to said first pumping laser, said first coupler splitting said first pumping laser optical energy into first and second pumping laser outputs;
    a fiber Bragg grating DFB-DBR interactive laser further comprising:
        a first optical fiber section doped with at least one rare-earth metal, said fiber section having first and second ends;
        a first fiber Bragg grating in said first optical fiber section at said first end;
        a second fiber Bragg grating in said first optical fiber section at said second end; and
        a third fiber Bragg grating in said first optical fiber section between said first and second fiber Bragg gratings, said third fiber Bragg grating having a 90° phase shift region therein, said first, second and third fiber Bragg gratings each having narrow reflective linewidths centered about said first wavelength;
    a second optical fiber section doped with at least one rare-earth metal;
    a first WDM coupler connected to said first pumping laser output, said first optical fiber section and said second optical fiber section so that said first pumping laser energizes said fiber Bragg grating DFB-DBR interactive laser for generating optical energy at said first wavelength into said second optical fiber section; and
    a second WDM coupler connected to said second pumping laser output, said second optical fiber section and said output optical fiber so that said first pumping laser energizes said second optical fiber section to amplify said optical energy at said first wavelength from said fiber Bragg grating DFB-DBR interactive laser for transmission into said output optical fiber.

12. The laser source of claim 11 wherein said first coupler splits most of said first pumping laser optical energy into said second pumping laser output.

13. The laser source of claim 11 further comprising
    a second pumping laser generating optical energy at a third wavelength; and
    a third WDM coupler connected to said second pumping laser, said first WDM coupler and said second optical fiber section so that said third WDM coupler transmits optical energy at said first wavelength from said first WDM coupler and said second pumping laser energizes said second optical fiber section to amplify said optical energy at said first wavelength.

14. The laser source of claim 13 wherein said wavelength of said fiber Bragg grating DFB-DBR interactive laser is in the 1550 nm range; said first pumping laser output comprises 980 nm light; and said second pumping laser output comprises 1480 nm light.

15. The laser source of claim 11 further comprising first and second fused splicings in said first optical fiber section, said first fused splicing between said first fiber Bragg grating and said third fiber Bragg grating, and said second fused splicing between said second fiber Bragg grating and said third fiber Bragg grating.

16. The laser source of claim 11 further comprising a first optical isolator connected between said output fiber and said second WDM coupler.

17. The laser source of claim 16 further comprising a second optical isolator connected between said first and third WDM couplers, said second optical isolator passing optical energy from said first WDM coupler to said third WDM coupler and blocking optical energy from said third WDM coupler to said first WDM coupler.

18. A laser source generating optical energy at a first wavelength for an output optical fiber, said laser source comprising:
    a first pumping laser generating optical energy at a second wavelength;
    a first coupler connected to said first pumping laser, said first coupler splitting said first pumping laser optical energy into first and second pumping laser outputs;

a second pumping laser generating optical energy at a third wavelength, said second pumping laser having a third pumping laser output;

a fiber Bragg grating DFB-DBR interactive laser further comprising:
  a first optical fiber section doped with at least one rare-earth metal, said fiber section having first and second ends;
  a first fiber Bragg grating in said first optical fiber section at said first end;

a second fiber Bragg grating in said first optical fiber section at said second end; and
  a third fiber Bragg grating in said first optical fiber section between said first and second fiber Bragg gratings, said third fiber Bragg grating having a 90° phase shift region therein, said first, second and third fiber Bragg gratings each having narrow reflective linewidths centered about said first wavelength;

a second optical fiber section doped with at least one rare-earth metal;

a first WDM coupler connected to said first pumping laser output, said first optical fiber section and said second optical fiber section so that said first pumping laser energizes said fiber Bragg grating DFB-DBR interactive laser for generating optical energy at said first wavelength;

a second WDM coupler connected to said second pumping laser output, said first WDM coupler and said second optical fiber section so that said second WDM coupler transmits optical energy at said first wavelength from said first WDM coupler and said second pumping laser energizes said second optical fiber section to amplify said optical energy at said first wavelength; and a third WDM coupler connected to said third pumping laser output, said second optical fiber section and said output optical fiber so that said second pumping laser energizes said second optical fiber section to amplify said optical energy at said first wavelength from said fiber Bragg grating DFB-DBR interactive laser for transmission into said output optical fiber.

19. The laser source of claim 18 wherein said first coupler splits most of said first pumping laser optical energy into said second pumping laser output.

20. The laser source of claim 18 wherein said wavelength of said fiber Bragg grating DFB-DBR interactive laser is in the 1550 nm range; said first pumping laser output comprises 980 nm light; and said second pumping laser output comprises 1480 nm light.

21. The laser source of claim 18 further comprising first and second fused splicings in said first optical fiber section, said first fused splicing between said first fiber Bragg grating and said third fiber Bragg grating, and said second fused splicing between said second fiber Bragg grating and said third fiber Bragg grating.

22. The laser source of claim 18 further comprising a first optical isolator connected between said first and second WDM couplers, said first optical isolator passing optical energy from said first WDM coupler to said second WDM coupler and blocking optical energy from said second WDM coupler to said first WDM coupler.

23. A method of manufacturing a fiber Bragg grating DFB-DBR laser having an optical fiber section doped with at least one rare-earth metal, a first fiber Bragg grating in a first end of said optical fiber section, a second fiber Bragg grating in a second end of said optical fiber section, and a third fiber Bragg grating in said optical fiber section between said first and second fiber Bragg gratings, said third fiber Bragg grating having a 90° phase shift region therein, said first, second and third fiber Bragg gratings each having narrow reflective linewidths centered about the same wavelength, said method comprising:
  generating UV light;
  providing a phase mask for said first, second and third fiber Bragg gratings;
  disposing said optical fiber section in proximity with said phase mask; and
  scanning said phase mask with said UV light so that interference patterns by said phase mask create said first, second and third fiber Bragg gratings in said optical fiber section.

24. The method of claim 23 wherein said scanning step comprises fixing said phase mask with respect to said optical fiber section and moving said UV light relative thereto.

25. The method of claim 23 wherein said scanning step comprises moving said UV light and said phase mask simultaneously with respect to said optical fiber section.

26. The method of claim 23 wherein said scanning step comprises first creating said third fiber Bragg grating, then creating said first fiber Bragg grating, and thereafter creating said second fiber Bragg grating.

27. The method of claim 26 wherein said scanning step comprises:
  creating said first fiber Bragg grating with a reflectivity greater than that of said second fiber Bragg grating;
  supplying said optical fiber section with pumping laser energy; and
  monitoring said second fiber Bragg grating reflectivity during creation of said second fiber Bragg grating so as to maximize the output power of the fiber Bragg grating interactive DFB-DBR laser.

* * * * *